W. A. SCHMIDT.
PROCESS AND APPARATUS FOR ACCELERATING CHEMICAL REACTIONS.
APPLICATION FILED JUNE 22, 1916.
1,252,726.
Patented Jan. 8, 1918.
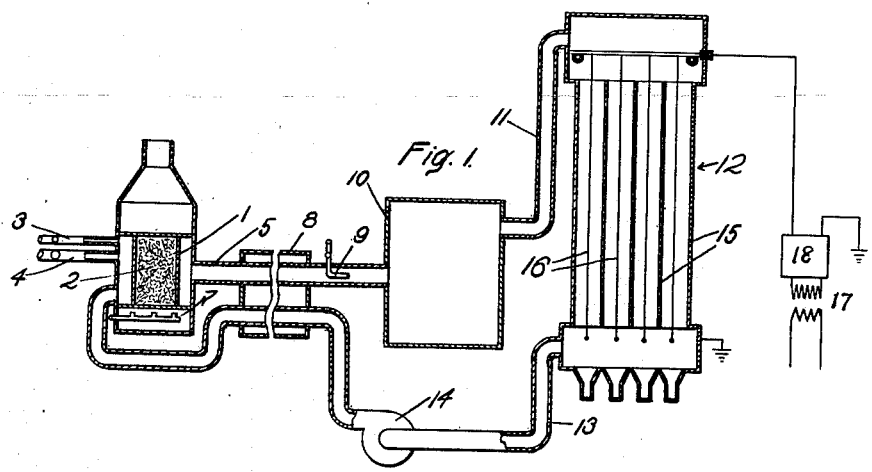
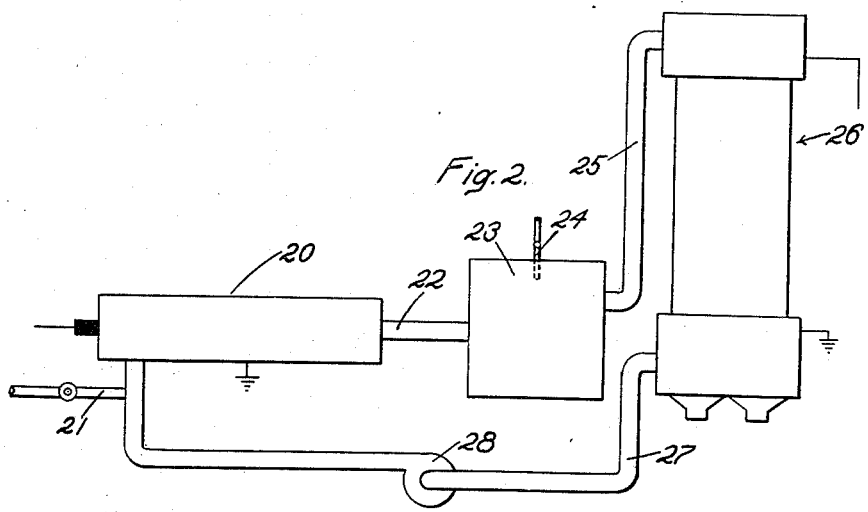
Inventor:
Walter A. Schmidt.
by Arthur P. Knight
his atty

UNITED STATES PATENT OFFICE.

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS AND APPARATUS FOR ACCELERATING CHEMICAL REACTIONS.

1,252,726.      Specification of Letters Patent.      Patented Jan. 8, 1918.

Application filed June 22, 1916. Serial No. 105,211.

*To all whom it may concern:*

Be it known that I, WALTER A. SCHMIDT, a citizen of the United States, residing at Los Angeles, in the county of Los Angeles, State of California, have invented a new and useful Process and Apparatus for Accelerating Chemical Reactions, of which the following is a specification.

This invention relates to improvements in processes for producing certain products from gases by synthetic or other chemical action. In the production of reaction products from a gas or gases there is, in general, a tendency to accumulation of the end product, which becomes mixed with the gas and retards the velocity of the reaction required to produce such end product, the amount of such retardation increasing with the concentration of the end product in accordance with the law of mass action. In some cases, for example in the synthetic production of ammonia, only a small degree of concentration of the end product is permissible in order to enable the reaction to take place effectively, and in other cases the presence of a gaseous end product in any considerable degree of concentration seriously retards the reaction.

The main object of the present invention is to provide for removing the end product in such cases as rapidly as possible from the mixture formed by the reaction, so as to maintain a low degree of concentration thereof and thereby maintain maximum reaction velocity and maximum effectiveness of the reaction.

The process consists essentially in subjecting the gaseous end product to the action of a suitable agent which will cause the formation of a mist or fume containing said end product as a constituent, then subjecting said fume or mist to an electrical precipitating action to separate it from the body of gases unacted on and then returning such gases for repetition of the original reaction, and so on in cyclic manner, so that the desired reaction is always taking place in the presence of a minimum concentration of end product.

The accompanying drawings illustrate apparatus suitable for carrying out my invention, and referring thereto:

Figure 1 is a diagrammatic vertical section of a form of such apparatus adapted for cyclic treatment of a mixture of gases forming a gaseous end product.

Fig. 2 is a diagrammatic elevation of apparatus suitable for carrying out my invention in connection with the manufacture of ozone.

Referring to Fig. 1, the apparatus therein shown comprises a receptacle or chamber 1 for containing a suitable catalyzer indicated at 2, said receptacle being provided with inlet pipes 3 and 4 for supply of the gaseous constituents required for the reaction and with an outlet pipe 5. Suitable heating means, indicated at 7 may be provided for maintaining the catalyzing chamber at proper temperature for the desired reaction. Means, indicated at 8 may be provided to cool the gases passing through the outlet pipe 5, if necessary. Said outlet pipe is connected to or provided with a means for supplying thereto an agent capable of forming a fume with the gaseous end product produced by the catalyzing action, said means consisting, for example, of a pipe 9 opening into the pipe 5. If necessary a chamber 10 may be provided to receive the mixture from pipe 5 and maintain the constituents thereof in contact for a sufficient time to complete the reaction. Said chamber 10 is provided with an outlet pipe 11 leading to an electrical precipitating apparatus indicated at 12. An outlet pipe 13 leads from said precipitating apparatus back to the catalyzing chamber 1. Any suitable means, such as a pump 14 may be provided for circulating the gases through the chambers and connections described. If cooling of the gases is necessary before the formation of the fume, it will in general be desirable to reheat the gases passing back to the catalyzer, and for this purpose the cooler 8 may be formed as a heat interchanger to transfer heat from the gases coming from the catalyzer chamber to the gases passing to the catalyzer chamber.

The electrical precipitating means 12 may be of any suitable form, comprising, for example, electrodes 15 and 16 between which an electrical field is maintained, and casing means provided with inlet and outlet connections whereby the gases are conducted between the electrodes. The electrodes are connected to receive high tension current from a transformer 17, preferably through a rectifier indicated at 18.

The process may be carried out in the above described apparatus as follows:

Assuming that the process is applied to the synthetic manufacture of ammonia, hydrogen and nitrogen gases are admitted to the chamber 1 through inlets 3 and 4 and are therein subjected to the action of a suitable catalyzing agent, for example, iron, uranium, or other well known agents for this purpose, indicated at 2, the gases being maintained at proper temperature by means 7 or otherwise, and at suitable pressure. The end product, namely, ammonia in gaseous form, passes through the outlet pipe 5 to chamber 10 wherein it is subjected to the action of the reacting medium supplied through inlet 9, said medium consisting, for example, of any suitable acid in the form of gas or vapor which reacts with the gaseous ammonia to form a product which is solid or liquid at the temperature of the apparatus and condenses into the form of a fume, mist or cloud. The resulting cloud, together with the hydrogen and nitrogen which have not converted into ammonia, passes through a pipe 11 into the electrical precipitator 12 wherein they are subjected to the action of an electrical field between the electrodes 15 and 16, and the gaseous or liquid product consisting, for example, of an ammonia salt, is precipitated, leaving the hydrogen and nitrogen substantially free of the end product. The mixture of hydrogen and nitrogen is then returned through pipe 13 to the reaction chamber 1 for cyclic repetition of the process, circulation of the gases in this manner being effected by the pump 14 or otherwise in any suitable manner. In some cases it may be necessary to cool the gases coming in from the catalyzing chamber before the formation of the fume and for this purpose the gases may be cooled by the means 8 in such manner as to conserve the heat as far as possible in reheating the gases returning to the catalyzer. By cooling the gases coming from the catalyzer sufficiently to condense the ammonia to form a mist, the use of any other agent for producing the mist may be dispensed with, the mist or cloud of condensed ammonia being then precipitated in the apparatus 12 and the remaining gases, free from ammonia being returned to the catalyzing chamber.

The invention may be applied in other cases of synthetic reaction or of reactions generally wherein the original constituents and the end products are gaseous and where it is desirable to maintain the concentration of the end product as low as possible. For example, the process may be applied to advantage in the manufacture of ozone from oxygen, for the purpose of producing ozonides or other oxidation products, the object of the invention in such cases being to accelerate the formation of ozone and to decrease the amount of energy required for such formation. An apparatus suitable for this purpose is shown diagrammatically in Fig. 2 wherein 20 designates an ozonizer of any suitable form provided with an inlet pipe 21 for oxygen, and an outlet pipe 22 leading to a fume chamber 23 provided with means 24 for injecting or distributing therein a suitable agent for reacting with the ozone to form a cloud or mist of suspended particles. An outlet pipe 25 leads from chamber 23 to electrical precipitator 26 which may be similar to that above described and is provided with an outlet pipe 27 leading back to the ozonizer 20, a pump or other means 28 being provided for maintaining the circulation.

In producing ozone in this apparatus the oxygen is furnished through inlet 21, for example, in the form of commercially pure oxygen, and in passing through the ozonizer 20 it is partly converted into ozone by the action of an electrical field in well known manner. The formation of ozone in this action takes place with comparative rapidity at first, but gradually decreases as the ozone concentration increases. According to this invention the oxygen containing a small portion of ozone is drawn off through outlet 22 before the concentration rises to a sufficient degree to seriously retard the formation of ozone, and oxygen clear of ozone is continually drawn in through the inlet 21 so that the action is always taking place in a body of oxygen having low concentration of ozone. The oxygen, carrying a small proportion of ozone, is passed through pipe 22 into the chamber 23 where it is brought into contact with a suitable agent for absorbing or reacting with the ozone to form a cloud or mist. For example, a gaseous hydrocarbon may be introduced through the inlet 24 to react with the ozone to form a solid or liquid ozonide which forms a cloud of suspended particles in the oxygen gas. The gas, together with such cloud, is drawn through the precipitator 26 and the suspended particles are, in such precipitator, separated from the gas and collected in any suitable manner and the gas, free from ozone, passes back to the ozonizer 20. Sufficient oxygen is furnished, continually or from time to time through inlet 21, to replenish the supply of oxygen and replace oxygen converted into ozone.

What I claim is:

1. The process of accelerating the velocity of a chemical reaction resulting in a gaseous end product which consists in acting on said end product to form a cloud of suspended particles, precipitating such cloud by electrical action, and then returning the remaining gases for a repetition of the reaction.

2. The process of accelerating the velocity of a chemical reaction taking place in a gaseous medium and resulting in a gaseous end product, which consists in bringing said end product in contact with a substance capable of reacting therewith to form a cloud of suspended particles containing said end product, then precipitating said cloud and returning the gaseous medium for repetition of the reaction.

3. The process which consists in causing two gases to partly react to form a gaseous end product, bringing said end product in contact with a substance capable of forming therewith a cloud of suspended particles, precipitating said cloud of particles by electrical action and returning the portion of the gases unacted on for a repetition of the process.

4. The process which consists in causing nitrogen and hydrogen to react to form gaseous ammonia, bringing such ammonia in contact with a suitable agent to form a cloud of suspended particles, precipitating such cloud by electrical action and then returning the portion of the nitrogen and hydrogen unacted upon for repetition of the process.

5. An apparatus for maintaining chemical reaction of gases forming a gaseous end product, consisting of a reaction chamber provided with means for inducing such reaction, a chamber connected to receive the end product and the unaffected gases from such reaction chamber and provided with means for supplying an agent for acting on such gaseous end product to form a cloud of suspended particles, precipitating means adapted to receive the gases from the last named chamber and provided with electrical means for precipitating the suspended cloud therefrom, and means for returning the gases from such precipitating means to the reaction chamber.

In testimony whereof I have hereunto set my hand, at Los Angeles, California, this 8th day of June, 1916.

WALTER A. SCHMIDT.